(12) United States Patent
Porsch et al.

(10) Patent No.: US 6,908,955 B2
(45) Date of Patent: *Jun. 21, 2005

(54) OLIGOMERIC DISPERSANT

(75) Inventors: Michael Porsch, Minneapolis, MN (US); Thomas M. Vickers, Jr., Concord Township, OH (US); Rainer Packe-Wirth, Trostberg (DE); Samy M. Shendy, Cuyahoga Falls, OH (US); Lynn E. Brower, Solon, OH (US); John Pickett, Bedford, OH (US); Frank Danko, Macedonia, OH (US); Runhai Lu, Stow, OH (US)

(73) Assignee: Construction Research & Technology GmbH, Trostberg (DE)

( * ) Notice: Subject to any disclaimer, the term of this patent is extended or adjusted under 35 U.S.C. 154(b) by 188 days.

This patent is subject to a terminal disclaimer.

(21) Appl. No.: 10/291,877

(22) Filed: Nov. 8, 2002

(65) Prior Publication Data

US 2003/0181579 A1 Sep. 25, 2003

Related U.S. Application Data

(63) Continuation-in-part of application No. 09/629,724, filed on Jul. 31, 2000, now Pat. No. 6,492,461, which is a continuation-in-part of application No. 09/350,394, filed on Jul. 9, 1999, now Pat. No. 6,133,347.

(51) Int. Cl.[7] .................. C04B 24/24; C08G 65/32; O08L 283/06
(52) U.S. Cl. .............. 524/5; 524/2; 524/4; 524/8; 525/54.2; 525/409; 525/527
(58) Field of Search .............. 524/2, 4–5, 8; 525/54.2, 409, 527

(56) References Cited

U.S. PATENT DOCUMENTS

| | | | |
|---|---|---|---|
| 3,884,671 A | | 5/1975 | Herman et al. |
| 4,508,572 A | | 4/1985 | Sakata et al. |
| 4,587,279 A | | 5/1986 | Salyer et al. |
| 4,648,982 A | * | 3/1987 | Gritti .......................... 252/75 |
| 4,650,522 A | * | 3/1987 | Teraji et al. ................. 106/727 |
| 4,808,641 A | | 2/1989 | Yagi et al. |
| 4,814,014 A | | 3/1989 | Arfei |
| 4,866,143 A | | 9/1989 | Gagnon et al. |
| 4,878,948 A | | 11/1989 | Shah |
| 4,891,072 A | | 1/1990 | Cooper |
| 4,946,904 A | | 8/1990 | Akimoto et al. |
| 5,041,477 A | | 8/1991 | Hays |
| 5,162,402 A | | 11/1992 | Ogawa et al. |
| 5,212,017 A | * | 5/1993 | Meder ......................... 428/447 |
| 5,250,113 A | * | 10/1993 | Berke et al. ................. 106/737 |
| 5,294,651 A | | 3/1994 | Stephens |
| 5,320,673 A | | 6/1994 | Carpenter |
| 5,358,566 A | | 10/1994 | Tanaka et al. |
| 5,362,324 A | | 11/1994 | Cerulli et al. |
| 5,565,420 A | | 10/1996 | Stearns |
| 5,583,183 A | | 12/1996 | Darwin et al. |
| 5,614,017 A | | 3/1997 | Shawl |
| 5,624,980 A | | 4/1997 | Kobori |
| 5,659,001 A | * | 8/1997 | de la Croi Habimana et al. ........................... 528/17 |
| 5,665,158 A | | 9/1997 | Darwin et al. |
| 5,665,842 A | * | 9/1997 | Leikauf ...................... 526/279 |
| 5,668,195 A | * | 9/1997 | Leikauf ......................... 524/5 |
| 5,677,196 A | * | 10/1997 | Herron et al. .............. 436/518 |
| 5,693,127 A | * | 12/1997 | Nigam et al. ................ 524/188 |
| 5,719,204 A | | 2/1998 | Beach et al. |
| 5,725,654 A | | 3/1998 | Shawl et al. |
| 5,753,744 A | | 5/1998 | Darwin et al. |
| 5,786,493 A | * | 7/1998 | Rauleder et al. ............ 556/443 |
| 5,849,219 A | | 12/1998 | De Laat et al. |
| 5,854,386 A | * | 12/1998 | Shen et al. .................. 528/403 |
| 5,880,182 A | | 3/1999 | Minomiya et al. |
| 5,910,372 A | * | 6/1999 | Griffin et al. ............... 428/429 |
| 5,916,539 A | * | 6/1999 | Pilgrimm ................. 424/9.322 |
| 5,919,881 A | | 7/1999 | Kinoshita et al. |
| 6,010,757 A | * | 1/2000 | Yamamoto et al. ........ 428/1.25 |
| 6,048,916 A | * | 4/2000 | Hirata et al. .................... 524/5 |
| 6,063,737 A | * | 5/2000 | Haberman et al. .......... 507/261 |
| 6,115,171 A | * | 9/2000 | Minami et al. ............. 359/285 |
| 6,174,980 B1 | * | 1/2001 | Hirata et al. ................ 526/320 |
| 6,228,499 B1 | * | 5/2001 | Nakauchi et al. ........... 428/412 |

FOREIGN PATENT DOCUMENTS

| | | |
|---|---|---|
| AU | B-51793/93 | 5/1994 |
| DE | 19750245 A1 | 5/1999 |
| DE | 19750248 A1 | 5/1999 |
| EP | 0271435 | 6/1988 |
| EP | 612702 A1 | 8/1994 |

(Continued)

OTHER PUBLICATIONS

Colfen et al. "Crystal Design of Calcium CarbonateMicroparticles Using Double–Hydrophilic Block Copolymers", Langmuir, p. 582–589 (Jul. 19, 1998).

Derwent WPI Publication, "Acc. No. 87–308793/198744, English language abstract for FR2595347A".

Yamamota, Tsuneo, et al. "Chemical Abstracts Publication XP–002152289—English language abstract for Japanese Kokal 77 76,327", vol. 88 (No. 58) (Dec. 1978).

Sanyo Chemical Industries, Ltd. Nihon Cement Co. Ltd., "Chemical Abstracts Publication XP–002152288—English language abstract for Japanese Publication JP 59144660", vol. 102 (No. 18), (May 1985).

*Primary Examiner*—Peter Szekely
(74) *Attorney, Agent, or Firm*—Curatolo Sidoti Co. LPA; Joseph G. Curatolo; James E. Oehlenschlager

(57) ABSTRACT

A composition that is a reaction product of two or three moieties. The first moiety (A) is a nonpolymeric, multifunctional moiety or combination of mono- or multifunctional moieties that adsorbs onto a cementitious particle. The second required moiety (C) is a linear or branched water soluble, nonionic polymer that is capable of providing dispersing capability. A third moiety (B), if present, is a nonpolymeric moiety disposed between the first and second moiety, to connect the first and second moieties.

41 Claims, No Drawings

FOREIGN PATENT DOCUMENTS

| | | |
|---|---|---|
| EP | 726044 A1 | 8/1996 |
| EP | 0803521 | 10/1997 |
| EP | 849338 A1 | 6/1998 |
| EP | 882603 B1 | 1/2000 |
| JP | 07-267705 * | 3/1994 |
| JP | 06-256054 * | 9/1994 |
| JP | 08-048852 * | 2/1996 |
| WO | WO 98/23653 | 6/1998 |
| WO | WO 98/51637 A1 | 11/1998 |
| WO | WO 00/44487 | 8/2000 |
| WO | WO 02/088241 * | 11/2004 |

* cited by examiner

OLIGOMERIC DISPERSANT

CROSS REFERENCE TO RELATED APPLICATIONS

This application is a continuation in part of U.S. Ser. No. 09/629,724, filed on Jul. 31, 2000, now U.S. Pat. No. 6,492,461 which is a continuation in part of U.S. Ser. No. 09/350,394, filed Jul. 9, 1999, now U.S. Pat. No. 6,133,347, both of which are incorporated herein by reference.

BACKGROUND

A cementitious mixture refers to pastes, mortars, and concrete compositions comprising a hydraulic cement binder. Pastes are defined as mixtures composed of a hydraulic cement binder, either alone or in combination with pozzolans such as fly ash, silica fume, calcined clay, or blast furnace slag, and water. Mortars are defined as pastes that additionally include fine aggregate. Concretes additionally include coarse aggregate. These compositions may additionally include other admixtures such as set retarders, set accelerators, defoaming agents, air-entraining or air detraining agents, corrosion inhibitors, water reducing agents, pigments, and any other admixture that does not adversely affect the advantageous results obtained by the present invention.

Dispersants are substances that improve the flow characteristics of the cement slurry by breaking up cement agglomerates and freeing the water, thus giving slurries of lower viscosity and allowing desirable flow conditions to be obtained at lower pump pressures. V. S. Ramachandran, *Concrete Admixtures Handbook: Properties, Science, and Technology*, Noyes Publications (Second Edition, 1995).

Dispersants have been used in the construction industry to disperse cementitious mixtures. Dispersants such as sulfonated melamine formaldehyde condensate (SMF), sulfonated naphthalene formaldehyde condensate (BNS), and lignosulfonates are commonly used as dispersants. However, these compounds require more than the desired amount of material to achieve a desired level of concrete workability or water reduction. In addition, these materials do not achieve full range (Type A to Type F) water reducing capability, as defined in ASTM C494. For example, lignosulfonates achieve only a low to mid range (5–12%) water reduction before severe set retardation occurs.

Dispersants are a necessary component in high strength and high durability concretes. Due to the requirement for the use of low water amounts in high performance concretes, sometimes high dispersant amounts are necessary to achieve workable concretes. High BNS levels can lead to undesirable retardation of set and may not provide the required workability retention over time.

It is desirable to provide a material that is several times more efficient as a cement or concrete dispersant than the traditional materials like lignosulfonates, BNS and SMF. Improving efficiency reduces the amount of material required to achieve a desired level of concrete workability or water reduction. With respect to the presently used dispersants, lignosulfonates, BNS and SMF, it is also desirable to improve slump retention while maintaining normal setting characteristics. Providing a dispersant with full range (Type A to F) water reducing capability is also a desirable characteristic.

One improvement in the prior art was to use polycarboxylate dispersants. Polycarboxylate dispersants are structured with a polymeric backbone, such as a carbon chain backbone, with pendant moieties. The pendant moieties provide the dispersing capabilities of the dispersant. Polycarboxylate dispersants are polymers with a carbon backbone with pendant side chains, wherein at least a portion of the side chains are attached to the backbone through a carboxyl group or an ether group. For example, polyacrylic acid has carboxylic groups attached to the backbone. Also, side chain moieties such as polyoxyalkylenes can be attached to the carboxylic groups to provide further dispersing capabilities. These dispersants operate by surrounding a particle to be dispersed, and then repulsion forces between each polymer chain keeps the particles apart and more fluid.

It is desirable to provide oligomeric dispersants for dispersing cementitious particles, wherein the dispersant adsorbs onto the particle to be dispersed.

SUMMARY OF THE INVENTION

A composition of matter is provided which comprises a reaction product of component A, optionally component B, and component C; wherein each component A is independently a nonpolymeric, multi-functional moiety or combination of mono or multifunctional moieties that adsorbs onto a cementitious particle, and contains at least one residue derived from a first component selected from the group consisting of sulfates, sulfonates, sulfinates, borates, boronates, boroxines, phosphoramides, non-sugar amines, amides, quaternary ammonium groups, non-sugar carboxylic acids, carboxylic acid esters, non-sugar alcohols, salts of any of the preceding moieties, and mixtures thereof, wherein component B is an optional moiety, where if present, each component B is independently a nonpolymeric moiety that is disposed between the component A moiety and the component C moiety, and is derived from a second component selected from the group consisting of linear saturated hydrocarbons, linear unsaturated hydrocarbons, saturated branched hydrocarbons, unsaturated branched hydrocarbons, alicyclic hydrocarbons, heterocyclic hydrocarbons, aryl, phosphoester, nitrogen containing compounds, and mixtures thereof; and wherein component C is at least one moiety that is a linear or branched water soluble, nonionic polymer substantially non-adsorbing to cement particles, and is selected from the group consisting of poly(oxyalkylene glycol), poly(oxyalkylene amine), poly (oxyalkylene diamine), monoalkoxy poly(oxyalkylene amine), monoaryloxy poly(oxyalkylene amine), monoalkoxy poly(oxyalkylene glycol), monoaryloxy poly (oxyalkylene glycol), poly(vinyl pyrrolidones), poly(methyl vinyl ethers), poly(ethylene imines), poly(acrylamides), polyoxazoles, and mixtures thereof.

A composition of matter is provided which comprises a reaction product of component A, optionally component B, and component C, wherein each component A is independently a nonpolymeric, multi-functional moiety or combination of mono or multifunctional moieties that adsorbs onto a cementitious particle, and contains at least one residue derived from a first component selected from the group consisting of alkyl trialkoxy silanes, alkyl triacyloxy silanes, alkyl triaryloxy silanes, salts of any of the preceding moieties, and mixtures thereof, wherein component B is an optional moiety, where if present, each component B is independently a nonpolymeric moiety that is disposed between the component A moiety and the component C moiety, and is derived from a second component selected from the group consisting of linear saturated hydrocarbons, linear unsaturated hydrocarbons, saturated branched hydrocarbons, unsaturated branched hydrocarbons, alicyclic hydrocarbons, heterocyclic hydrocarbons, aryl, phosphoester, nitrogen containing compounds, and mixtures thereof, and wherein component C is at least one moiety that is a linear or branched water soluble, nonionic polymer substantially non-adsorbing to cement particles, and is selected from the group consisting of poly(oxyalkylene glycol), poly(oxyalkylene amine), poly(oxyalkylene diamine), monoalkoxy poly(oxyalkylene amine), monoaryloxy poly(oxyalkylene amine), monoalkoxy poly(oxyalkylene glycol), monoaryloxy poly(oxyalkylene glycol), poly(vinyl pyrrolidones), poly(methyl vinyl ethers), poly(ethylene imines), poly(acrylamides), polyoxazoles, and mixtures thereof.

A cementitious mixture is provided wherein a cementitious material and a dispersant comprising a reaction product of component A, component B, and component C, wherein each component A is independently a nonpolymeric, multi-functional moiety or combination of mono or multifunctional moieties that adsorbs onto a cementitious particle, and contains at least one residue derived from a first component selected from the group consisting of sulfates, sulfonates, sulfinates, borates, boronates, boroxines, phosphoramides, amines, amides, quaternary ammonium groups, carboxylic acids, carboxylic acid esters, alcohols, carbohydrates, phosphate esters of sugars, borate esters of sugars, sulfate esters of sugars, salts of any of the preceding moieties, and mixtures thereof, and wherein component B is an optional moiety, where if present, each component B is independently a nonpolymeric moiety that is disposed between the component A moiety and the component C moiety, and is derived from a second component selected from the group consisting of linear saturated hydrocarbons, linear unsaturated hydrocarbons, saturated branched hydrocarbons, unsaturated branched hydrocarbons, alicyclic hydrocarbons, heterocyclic hydrocarbons, aryl, phosphoester, nitrogen containing compounds, and mixtures thereof, and wherein component C is at least one moiety that is a linear or branched water soluble, nonionic polymer substantially non-adsorbing to cement particles, and is selected from the group consisting of poly(oxyalkylene glycol), poly(oxyalkylene amine), poly(oxyalkylene diamine), monoalkoxy poly(oxyalkylene amine), monoaryloxy poly(oxyalkylene amine), monoalkoxy poly(oxyalkylene glycol), monoaryloxy poly(oxyalkylene glycol), poly(vinyl pyrrolidones), poly(methyl vinyl ethers), poly(ethylene imines), poly(acrylamides), polyoxazoles, and mixtures thereof.

DETAILED DESCRIPTION

The oligomeric cement dispersant provided does not contain a polymeric backbone with pendant groups like dispersants of the prior art. Rather, the oligomeric cement dispersant has a moiety that will adsorb onto the particle to be dispersed by means of one or more residues attached to an adsorbing moiety of absolute molecular weight. The adsorbing moiety acts as an "anchor" to hold the dispersant onto the particle to be dispersed.

One embodiment of the composition of matter is a composition of matter adapted for dispersing cementitious particles in water comprising a reaction product of component A, optionally component B, and component C.

Each component A is independently a nonpolymeric, multi-functional moiety or combination of mono or multifunctional moieties that adsorbs onto a cementitious particle, and contains at least one residue derived from a first component selected from the group consisting of sulfates, sulfonates, sulfinates, alkyl trialkoxy silanes, alkyl triacyloxy silanes, alkyl triaryloxy silanes, borates, boronates, boroxines, phosphoramides, non-sugar amines, sugar amines, amides, quaternary ammonium groups, sugar acids, lactones of sugar acids, non-sugar carboxylic acids, carboxylic acid esters, non-sugar alcohols, sugar alcohols, salts of any of the preceding moieties, and mixtures thereof;

The salt of moiety A is selected from the group consisting of lithium, sodium, potassium, calcium, magnesium, aluminum, iron, ammonia, amines, and mixtures thereof. The term amines is meant to include primary, secondary, and tertiary amines, including, but not limited to, substituted amines such as triethanolamine or morpholine.

Molecules of the A moiety include, but are not limited to, tris(hydroxymethyl) aminomethane, aryl boronic acids, esters of aryl boronic acids, aryl dioxaborolanes, triaryl boroxines, alkyl phosphonates, substituted alkyl phosphonates, alkyl phosphinates, substituted alkyl phosphinates, trialkoxyboroxines, alkyl trialkoxy silanes, alkyl triacyloxy silanes, alkyl triaryloxy silanes, and mixtures thereof. The alkyl groups in the above molecules are generally $C_1$ to about $C_6$ groups and the aryl groups in the above molecules are generally about $C_6$ to about $C_{10}$ groups.

Illustrative examples of molecules used to construct the A moiety include, but are not limited to 2-carboxyethyl phosphonic acid, sulfosuccinic acid, 2-phosphono-1,2,4-butane tricarboxylic acid, cyclohexane hexacarboxylic acid, mellitic acid, diethylenetriamine pentaacetic acid, 3,3',4,4'-benzophenone tetracarboxylic acid, 2-(4'carboxyphenyl)-1,3,2-dioxaborolane, triphenyl boroxine, 4-carboxyphenyl boronic acid, 4-formylphenyl boronic acid, 2-(4'-formylphenyl)-1,3,2-dioxaborolane, aminopropyltrimethoxysilane, bis(3-trimethoxysilylpropyl)amine, bis(3-triethoxysilylpropyl)amine, aminopropyltriethoxysilane, 3-glycidoxypropyltrimethoxy silane, 3-glycidoxypropyltriethoxysilane, 3-(triethoxysilyl)propyl isocyanate, 3-(trimethoxysilyl)propyl isocyanate, diaminopropane-N,N,N',N'-tetraacetic acid, 1,2,3,4-butanetetracarboxylic acid, nitrilotriacetic acid, N-(phosphonomethyl)iminodiacetic acid, 3-[[tris(hydroxymethyl)methyl]amino]-1-propanesulfonic acid, 2-[[tris(hydroxymethyl)methyl] amino]-1-ethanesulfonic acid, 3-[bis(2-hydroxyethyl) amino]-2-hydroxy-1-propanesulfonic acid, 3-[N-trishydroxymethylmethylamino]-2-hydroxypropanesulfonic acid, N-tris[hydroxymethyl]methyl-4-aminobutanesulfonic acid, 3-aminoadipic acid, aspartic acid, α-glutamic acid, β-glutamic acid, 1,3-diamino-2-hydroxypropane-N,N,N',N'-tetraacetic acid, triethylenetetraaminehexaacetic acid, mannosamine, tris(hydroxymethyl)aminomethane, γ-carboxyglutamic acid, β-carboxyaspartic acid, α-hydroxymethylaspartic acid, tricine, 1,2,3,4-cyclopentanetetracarboxylic acid, fructose, sucrose, salts of any of the preceding moieties, and mixtures thereof.

Each A moiety has one or more functional groups. When the A moiety has one functional group (mono-functional), two or more A moieties are combined to provide for multiple functional groups (multi-functional) in the oligomeric dispersant. When the A moiety has multiple functionalities (multi-functional), there is no requirement that more than one A moiety must be used. Examples of the residue include, but are not limited to, hydroxyl, carboxylate, sulfate, sulfonate, sulfinate, phosphate, phosphonate, phosphinates, borate, boronate, boroxine, dioxaborolane, amine, quaternary ammonium, and mixtures thereof. The functional groups attach to the cement particle to be dispersed by adsorbing onto the cement particle. The more functional groups that are present on the A moiety, the more strongly the A moiety can anchor to the cement particle.

Component B is an optional moiety, and if present, each B is independently a nonpolymeric moiety that is disposed between the A moiety and the C moiety, and is derived from a second component selected from the group consisting of $C_1$ to about $C_6$ linear saturated hydrocarbons, $C_1$ to about $C_6$ linear unsaturated hydrocarbons, $C_1$ to about $C_6$ branched saturated hydrocarbons, $C_1$ to about $C_6$ branched unsaturated hydrocarbons, about $C_5$ to about $C_{10}$ alicyclic hydrocarbons, about $C_4$ to about $C_{10}$ heterocyclic hydrocarbons, about $C_6$ to about $C_{10}$ arylenes, nitrogen containing compounds, and mixtures thereof. Nitrogen containing compounds include, but are not limited to, any amine, urea, or isocyanate. For heterocyclic hydrocarbons, the heteroatom is preferably nitrogen, oxygen, or sulfur. The heterocyclic hydrocarbons may contain more than one heteroatom. The heteroatoms in these multiple heteroatom heterocyclic hydrocarbons may all be the same heteroatom, or they can be different.

Illustrative examples of the B moiety include, but are not limited to, methylene, ethylene, n-propylene, n-butylene, n-pentylene, n-hexylene, isobutylene, neopentylene, propenylene, isobutenylene, diethylene triamine, triethylene tetramine, tetraethylene pentamine, pentaethylene hexamine, a residue derived from toluene diisocyanate, a residue derived from isophorone diisocyanate, a residue derived from heterocyclic hydrocarbons containing two or three nitrogen heteroatoms, phenylene, substituted arylenes such as

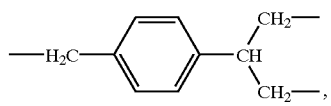

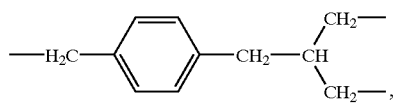

and mixtures thereof. Preferred nitrogen heteroatom heterocyclic hydrocarbons include residues derived from pyrazine, residues derived from pyridazine, residues derived from pyrimidine, residues derived from pyrazole, and residues derived from melamine.

Each C component is at least one moiety that is a linear or branched water soluble, nonionic polymer substantially non-adsorbing to cement particles, and is preferably selected from the group consisting of poly(oxyalkylene glycol), poly(oxyalkylene amine), poly(oxyalkylene diamine), monoalkoxy poly(oxyalkylene amine), monoaryloxy poly(oxyalkylene amine), monoalkoxy poly(oxyalkylene glycol), monoaryloxy poly(oxyalkylene glycol), poly(vinyl pyrrolidones), poly(methyl vinyl ethers), poly(ethylene imines), poly(acrylamides), polyoxazoles, and mixtures thereof.

The C moiety has a number average molecular weight from about 500 to about 100,000. In one embodiment, the C moiety has a number average molecular weight from about 1,000 to about 50,000. In another embodiment, the C moiety has a number average molecular weight from about 1,000 to about 30,000.

In one embodiment the oligomeric dispersant has a number average molecular weight from about 650 to about 100,000. In another embodiment, the dispersant has a number average molecular weight from 1,150 to about 50,000. In a further embodiment, the dispersant has a number average molecular weight from about 1,150 to about 30,000.

In one embodiment the dispersant can have a structure represented by the following general formulas:

(i) $A_x$—C;
(ii) $A_x$—C - $A_x$;
(iii) C—$A_x$—C;
(iv) $(A_x)_y$—B—$(C)_z$;
(v) $(C)_z$—B—$A_x$—B—$(C)_z$;
(vi) $(A_x)_y$—B—C—B—$(A_x)_y$;

and mixtures thereof, wherein x is preferably an integer from 1 to 3 and represents the number of independent A moieties, y is preferably an integer from 1 to 3 and represents the number of independent A moieties, and z is preferably an integer from 1 to 3 and represents the number of independent C moieties.

For further clarification, Ax is preferably at least one of A-, A-A-, or A-A-A-; B—$(C)_z$ is preferably at least one of

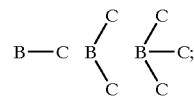

and $(A_x)_y$—B is preferably at least one of

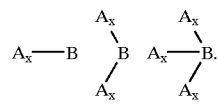

In another embodiment, the above composition of matter is incorporated into a cementitious mixture with a cementitious material, wherein the cementitious material comprises a hydraulic cement and optionally at least one pozzolan. The oligomeric dispersant can be added as an admixture alone or in combination with other admixtures in the field, or can be added to the cementitious mixture prior to delivery to the field.

A cementitious mixture refers to pastes, mortars, and concrete compositions comprising a hydraulic cement binder. Pastes are mixtures composed of a hydraulic cement binder, and mortars are pastes that additionally include fine aggregate.

The hydraulic cement comprising the cementitious mixture for which the dispersants are effective is selected from the group consisting of portland cement, masonry cement, oil well cement, alumina cement, refractory cement, magnesia cement, calcium sulfoaluminate cement, and mixtures thereof.

Aggregate can be included in the cementitious mixture to provide for mortars which include fine aggregate, and concretes which also include coarse aggregate. The fine aggregate are materials that pass through a Number 4 sieve (ASTM C125 and ASTM C33), such as silica sand. The coarse aggregate are materials that are retained on a Number 4 sieve (ASTM C125 and ASTM C33), such as silica, quartz, crushed round marble, glass spheres, granite, limestone, calcite, feldspar, alluvial sands, or any other durable aggregate, and mixtures thereof.

Additionally, cement admixtures may be included in the cementitious mixture. Cement additives that can be added include, but are not limited to, set accelerators, set retarders, air entraining agents, air detraining agents, foaming agents, defoaming agents, corrosion inhibitors, shrinkage reducing agents, other known dispersing agents, pozzolans, pigments, and mixtures thereof.

The cementitious mixture may further comprise water. The water can be present in an amount from about 20% to about 100% based on the dry weight of the cementious material.

The dispersant of the composition of matter is generally present in the cementitious mixture in an amount from about 0.005 to about 2% based on the dry weight of the cementitious material. Preferably, the dispersant is present in an amount from about 0.01% to about 1%.

An additive selected from the group consisting of soil and pozzolans such as calcined clay, silica fume, fly ash and blast furnace slag and mixtures thereof can be included in the cementitious mixture. The soil can be any soil including, but not limited to, fine sands, silty soils, and clay. The additive can replace up to about 70% of the cement. Preferably, the additive replaces up to 40% of the cement.

In another embodiment of the present invention, there is provided a method of dispersing a cementitious mixture comprising a hydraulic cement in water, including providing in said cementitious mixture the above described oligomeric cement dispersant.

In another embodiment of the invention, an oligomeric dispersant wherein at least one A moiety in the oligomeric dispersant is blocked is used in combination with a second dispersant which is selected from another oligomeric dispersant of the composition of matter or any other suitable cementitious dispersant. By "blocked" it is meant that the residue on the A moiety does not interact with the cement until the residue is liberated. The residue is liberated/deblocked over time by hydrolyzing in the alkaline environment of the cementitious system. This provides for latent dispersant properties.

The effect of liberating over time results in a delay of dispersing performance that leads to extended slump retention performance. The residues on the A moiety that are blocked include, but are not limited to, trialkoxy silanes, triacyloxy silanes, and triaryloxy silanes. A preferred blocked residue is trialkoxy silanes.

The blocked oligomeric dispersant can be present in a cementitious mixture in an amount from about 0.005 to about 2% based on the dry weight of the cement. Preferably, the blocked oligomeric dispersant is present in an amount from about 0.01% to about 1%. Preferably, the ratio of the blocked oligomeric dispersant to the other dispersant is from about 1:10 to about 5:1. More preferably, the ratio is about 1:5 to about 3:1.

By any cementitious dispersant it is meant to include all chemicals that function as a dispersant, water reducing agent, or plasticizer for cement. Illustrative examples include, but are not limited to, sulfonated naphthalene formaldehyde polymers, sulfonated melamine formaldehyde polymers, lignosulfonates, polyacrylic acids, polymethacrylic acids, polycarboxylates, and polyaspartates.

SPECIFIC EMBODIMENTS OF THE INVENTION

Oligomeric dispersants according to the composition of matter were synthesized and tested as described below. The molecular weights used herein are number average molecular weights. The following tests were used: Slump (ASTM C143), Air content (ASTM C231), and Set time (ASTM C403). Aggregates met the specifications of ASTM C33.

SYNTHESIS EXAMPLE 1

1.1 g (0.003 mole) of 1,2,3,4,5,6-cyclohexane hexacarboxylic acid was suspended in 5.5 g of deionized water. 6.52 g of methoxy polyoxyalkylene amine (JEFFAMINE® M-2070 (XTJ-508) from Huntsman Corporation with a 2000 molecular weight) was slowly added to the mixture to achieve a homogeneous solution. 0.001 g of 4-methoxy phenol was added while stirring the solution. The solution was heated to 180° C. under nitrogen gas stream for 60 minutes. The reaction mixture was cooled to room temperature. The reaction product was dissolved in aqueous sodium hydroxide solution to obtain a 39.1% solids solution at pH 8.4.

SYNTHESIS EXAMPLE 2

0.57 g (3.7 mmole) of 2-carboxyethylphosphonic acid was dissolved in 6 g of water and 11.11 g (3.7 mmole) of methoxypolyoxyalkylene amine (M3000 from BASF with a 3000 molecular weight) was added. The mixture was heated under nitrogen at 160° C. for 4.5 hours.

SYNTHESIS EXAMPLE 3

2.44 g of gluconic acid solution (48.2% aqueous solution) was combined with 2 g of deionized water in a 50 ml round bottom flask. 6.12 g of methoxy polyoxyalkylene amine (JEFFAMINE® M-1000 (XTJ-506) from Huntsman Corporation with a 1000 molecular weight) was added in portions while stirring. 0.002 g of 4-methoxy phenol was added. The solution was heated to 160° C. under nitrogen stream for 90 minutes. The mixture was cooled to room temperature. The reaction mixture was dissolved in water to obtain a 40% solids solution at neutral pH.

SYNTHESIS EXAMPLE 4

A solution of 4.03 g (16.3 mmol) of 3-(triethoxysilyl) propyl isocyanate in 20 ml of tetrahydrofuran (THF) was added to 0.84 g (8.15 mmol) of diethylenetriamine in a flask cooled in an ice bath. The mixture was stirred at 0° C. for 1 hour, then at ambient temperature for 4 hours. The solvent was evaporated and the viscous, colorless product was dried in a vacuum.

0.848 g (1.42 mmol) of the product was dissolved in 30 ml THF. 2.92 g (1.42 mmol) methoxy polyoxyethylene glycol-chloroformate, prepared from methoxy polyoxyethylene glycol (MPEG 2000 from Harcros Organics, Inc. with a 2000 molecular weight) and triphosgene, and 0.2 ml triethylamine were added to the solution. The mixture was stirred at ambient temperature for 3 hours. The material was filtered and the solvent was evaporated. The resulting pale yellow solid was vacuum dried.

SYNTHESIS EXAMPLE 5

131.6 g (0.048 equivalents of amine) of methoxy polyoxyalkylene amine (JEFFAMINE® XTJ-234 from Huntsman Corporation with a 3000 molecular weight) was combined with 10 g (0.048 mole) of α-D-glucoheptonic-γ-lactone in an oven dried 250 ml round bottom flask. The stirred mixture was heated to 110° C. under a dry nitrogen gas purge for 5.5 hours.

SYNTHESIS EXAMPLE 6

5.08 g of polyether amine ($M_n$=3785; 0.0013 mole; 0.0026 equivalent of amine) and 0.537 g (0.0026 mole) of α-D-glucoheptonic-γ-lactone was combined in a dried 50 ml round bottom flask containing a stir bar. The flask was purged with dry nitrogen gas and the contents heated to 110° C. under a nitrogen gas purge for 3.25 hours. The synthesis reaction is set forth below:

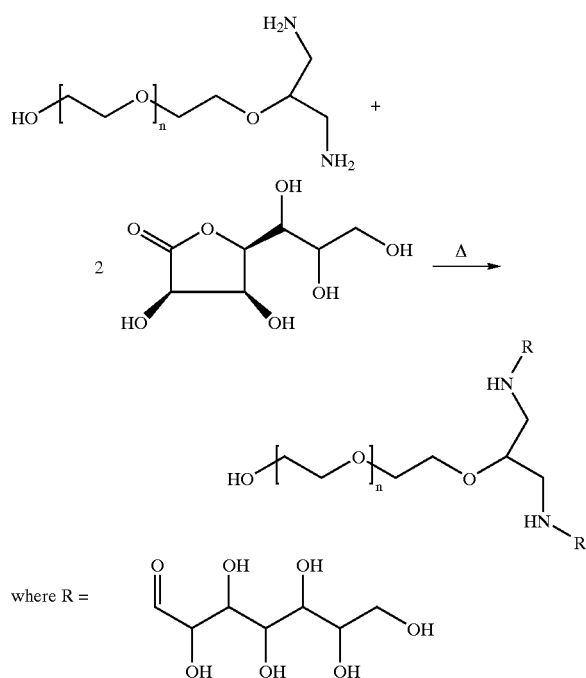

EXAMPLE 1

Dispersants of the composition of matter were prepared and compared to dispersants of the prior art. For the A moiety, 1,2,3,4,5,6-cyclohexane hexacarboxylic acid was used in all samples for this example. For the C moiety, methoxy polyoxyalkylene amines were used. The following materials were used for the samples: Sample A, JEFFAMINE® M-1000 (XTJ-506) from Huntsman Corporation with a 1000 molecular weight; Sample B, JEFFAMINE® M-2070 (XTJ-508) from Huntsman Corporation with a 2000 molecular weight; Sample C, JEFFAMINE® XTJ-234 from Huntsman Corporation with a 3000 molecular weight; and sample D methoxy polyoxyethylene amine from Shearwater Polymers, Inc. with a 5000 molecular weight. Finally, a beta-naphthalene sulfonate formaldehyde condensate (BNS) dispersant was tested as a comparison. The specific level of dispersant used is listed below in Table 1.

The water to cement ratio used was 0.35. The dispersant and water were hand mixed into 500 g of Portland Type I cement and mixed to a uniform consistency. The paste was then mechanically mixed at 700 rpm for one minute. The results of the testing are shown below in Table 1.

TABLE 1

| Sample | Dose (% of cement) | Paste Mass Flow Rate (g/sec) | Paste Spread Diameter (cm) |
|---|---|---|---|
| A | 0.2 | 109 | 12.6 |
| B | 0.2 | 66 | 11.0 |
| C | 0.2 | 59 | 10.7 |
| D | 0.2 | 53 | 10.6 |
| BNS | 0.2 | 17 | 0 |

The molecular weight of the "C" moiety of the oligomeric dispersants of the composition of matter did not influence the paste mass flow rate and the paste spread diameter. Compared to the BNS dispersants of the prior art, performance was improved.

EXAMPLE 2

The relationship between the number of attached C moieties on the A moiety and performance was tested. For the A moiety, 1,2,3,4,5,6-cyclohexane hexacarboxylic acid was used in all samples for this example. For the C moiety, a methoxy polyoxyalkylene amine, JEFFAMINE® M-1000 (XTJ-506) from Huntsman Corporation with a 1000 molecular weight was used. The molar ratio of the A moiety to the C moiety for the samples were: Sample A 1:1 (corresponding to general formula i, $A_x$-C; same sample from Example 1); Sample E 1:1.25, and Sample F 1:1.75 (E and F correspond to general formula iii, C-$A_x$-C). The prior art comparative example was the same as in Example 1. The samples were prepared as described above in Example 1. The results of the testing are shown below in Table 2.

TABLE 2

| Sample | Dose (% of cement) | Paste Mass Flow Rate (g/sec) | Paste Spread Diameter (cm) |
|---|---|---|---|
| A | 0.2 | 109 | 12.6 |
| E | 0.2 | 61 | 10.8 |
| F | 0.2 | 13 | 0 |
| BNS | 0.2 | 17 | 0 |

As shown in Table 2, as more C moieties are attached to the A moiety, the effectiveness as a dispersant decreases. As more C moieties are added, there are fewer functional groups with which to adsorb onto the particle to be dispersed. Anchor group binding strength is preferably balanced with the C moiety size and number for optimum performance.

EXAMPLE 3

The relationship of A moiety structure on dispersability was tested at a higher water to cement ratio. Samples A, B, C, D, and F were prepared as described above. Sample G was prepared with 2-carboxyethylphosphonate as the A moiety with a methoxy polyoxyalkylene amine, JEFFAMINE® M-1000 (XTJ-506) from Huntsman Corporation with a 1000 molecular weight, as the C moiety. Also, the samples were compared to a plain paste without any dispersant, and a calcium lignosulfonate dispersant containing sample was tested as a comparison. The water to cement ratio in this example was 0.42. The mix procedure was the same as in Example 1, except that each paste, except sample G, was stored for five minutes and then mechanically re-mixed for one minute at 700 rpm. Sample G was mixed as in Example 1. The test results are shown in Table 3 below.

TABLE 3

| Sample | Dose (% of cement) | Initial Paste Mass Flow Rate (g/sec) | Final Paste Mass Flow Rate (g/sec) | Initial Spread Diameter (cm) | Final Spread Diameter (cm) |
|---|---|---|---|---|---|
| Plain | — | 60 | 29 | 9.7 | 7.8 |
| A | 0.1 | 128 | 101 | 13.0 | 12.2 |
| F | 0.1 | 116 | 73 | 12.1 | 11.4 |
| B | 0.1 | 133 | 90 | 13.0 | 12.3 |
| C | 0.1 | 121 | 91 | 12.6 | 11.2 |
| D | 0.1 | 122 | 79 | 12.6 | 11.2 |
| G | 0.2 | 75 | 51 | 10.9 | 10.4 |
| Ca Ligno-sulfonate | 0.19 | 86 | 44 | 11.0 | 9.6 |
| BNS | 0.1 | 80 | 33 | 10.5 | 8.6 |

The results in Table 3 show that the plain sample and the lignosulfonate sample lose about half of the flow in about 20 minutes. The BNS loses more than half of the initial flow. The dispersants of the present invention, however, lose less than half of the initial flow in the same time period. The dispersants of the composition of matter perform better than lignosulfonates at a lower dosage and perform better than BNS at the same dosage.

EXAMPLE 4

The relationship of dispersant structure, as influenced by C moiety molecular weight, to initial set time of a cement paste was tested. The dispersants tested were those from the above examples. The water to cement ratio was 0.35. All dispersants were added at 0.2% based on the weight of cement. The mixing was the same as described above in Example 1. The initial set time was tested using a Form+Test automated set time apparatus using 300 g of each prepared paste. The results are listed in Table 4 below.

TABLE 4

| Sample | MW of C Moiety | Initial Set Time (hours) |
| --- | --- | --- |
| A | 1000 | 12.1 |
| B | 2000 | 10.2 |
| C | 3000 | 7.5 |
| D | 5000 | 6.1 |
| Ca Lignosulfonate | N/A | 6.5 |
| BNS | N/A | 4.9 |

N/A = not applicable

TABLE 4A

| Sample | Molar Ratio A moiety to C moiety | Initial Set Time (hours) |
| --- | --- | --- |
| A | 1:1 | 12.1 |
| E | 1:1.25 | 10.2 |
| F | 1:1.75 | 7.0 |
| Ca Lignosulfonate | N/A | 6.5 |
| BNS | N/A | 4.9 |

N/A = not applicable

The results in Table 4A show that as more C moieties are attached to the A moiety, the initial set time decreases.

EXAMPLE 5

The relationship of the A moiety functionality to fluidity of a cement paste was tested. The water to cement ratio was 0.35. The preparation of the paste samples was the same as in Example 3 above. The C moieties for the samples were methoxy polyoxyalkylene amine, JEFFAMINE® M-1000 (XTJ-506) from Huntsman Corporation with a 1000 molecular weight for Samples 2–6, and methoxy polyoxyethylene glycol from Union Carbide Corporation with a 2000 molecular weight for Sample 1.

TABLE 5

| Sample | Starting A moiety | A Moiety Functionality after attachment to the C moiety | C Moiety MW | Number of A Moieties | Dose (% of cement) | Paste Mass Flow Rate (g/sec) | Paste Spread Diameter (cm) |
| --- | --- | --- | --- | --- | --- | --- | --- |
| 1 | succinic anhydride | 1-COOH | 2000 | 1 | 0.2 | 0 | 0 |
| 2 | 2-carboxyethyl phosphonic acid | 1-PO$_3$H$_2$ | 1000 | 1 | 0.3 | 7.9 | 0 |
| 3 | citric acid | 2-COOH 1-OH | 1000 | 1 | 0.3 | 14 | 0 |
| 4 | 1,2,3,4,5,6-cyclohexane hexacarboxylic acid | 5-COOH | 1000 | 1 | 0.2 | 109 | 12.6 |
| 5 | mellitic acid | 5-COOH | 1000 | 1 | 0.2 | 72 | 10.0 |
| 6 | gluconic acid | 5-OH | 1000 | 1 | 0.2 | 62 | 12.7 |

Table 4 shows that as the molecular weight of the C moiety increases, the initial set time is reduced.

EXAMPLE 4A

The relationship of the number of attached C moieties on the A moiety in the dispersant structure to initial set time of a cement paste was tested. The dispersants are those from the above examples. The water to cement ratio was 0.35. All dispersants were added at 0.2% based on the weight of cement. The mixing was the same as above Example 1. The initial set time was tested using a Form+Test automated set time apparatus using 300 g of each prepared paste. The results are listed in Table 4A below.

The total number of active functional groups on the A moiety(s) influences the performance of the dispersant. As the total number of active functional groups increases, the dispersing performance increases.

EXAMPLE 6

The A moiety was varied to compare performance against prior art dispersants and a plain cement paste reference. The A moieties tested are listed below in Table 6. The C moiety was a methoxy polyoxyalkylene amine, JEFFAMINE® XTJ-234 from Huntsman Corporation with a 3000 molecular weight. The reference dispersant was a polymeric carboxylate backbone with polyether group side chains. The water to cement ratio was 0.35. The mix procedure was the same as in Example 1. The results are listed below in Table 6.

TABLE 6

| Sample | Dose (% of cement) | Initial Paste Mass Flow Rate (g/sec) | Final Paste Mass Flow Rate (g/sec) | Initial Spread Diameter (cm) | Final Spread Diameter (cm) |
|---|---|---|---|---|---|
| Plain | — | 0 | 0 | 0 | 0 |
| Gluconate as "A" | 0.2 | 66 | 53 | 14 | 14 |
| Glucoheptonate as "A" | 0.15 | 95 | 85 | 19.5 | 19.5 |
| Glucoheptonate as "A" | 0.1 | 71 | 58 | 14.7 | 14.5 |

TABLE 6-continued

| Sample | Dose (% of cement) | Initial Paste Mass Flow Rate (g/sec) | Final Paste Mass Flow Rate (g/sec) | Initial Spread Diameter (cm) | Final Spread Diameter (cm) |
|---|---|---|---|---|---|
| Ca Lignosulfonate | 0.3 | 5.6 | 0 | 0 | 0 |
| BNS | 0.3 | 81 | 25 | 10.7 | 7.3 |
| Ref. Polycarboxylate | 0.1 | 110 | 73 | 16.7 | 16.0 |

The results in Table 6 show improved dispersant performance by the oligomeric dispersants over the calcium lignosulfonate and BNS dispersants, and comparable performance to the polymeric carboxylate/polyether dispersant. Also, glucoheptonate (with 6 hydroxyl groups) as the A moiety performs better than gluconate (with 5 hydroxyl groups) as the A moiety.

EXAMPLE 7

Several dispersants according to the composition of matter were compared to a plain sample and a calcium lignosulfonate dispersant in a concrete formulation.

The A moiety was either gluconate or glucoheptonate. The C moiety was a methoxy polyoxyalkylene amine, being either JEFFAMINE® M-2070 (XTJ-508) from Huntsman Corporation with a 2000 molecular weight or JEFFAMINE® XTJ-234 from Huntsman Corporation with a 3000 molecular weight.

The plain mix consisted of 12.1 kg of Portland cement, 37.8 kg of crushed stone, 24.9 kg of sand, and 6.65 kg of water to provide a water to cement ratio of 0.55. The amount of dispersant is listed below in Table 7. The mixes were adjusted with sand and stone to compensate for the reduced water requirement with a dispersant to maintain a constant concrete volume for all mixes. Dispersed mixes contained less water, as indicated by the % water reduction in Table 7.

The concrete mixer was loaded with a portion of the mix water. The dispersant, stone, cement and sand were added to the mixer. The mixer was started and the remaining water was added. The mixture was mixed for 5 minutes at a drum rotation rate of about 19 rpm. Note, mixes 3–6 contained a defoamer, which was a non-silicone proprietary mixture sold as SURFYNOL® DF-75 from Air Products, added at 0.75% by weight of the dispersant.

TABLE 7

| Sample | Dose (%) | Water Reduction (%) | Slump (in) | % Air | Initial Set Time | Compressive Strength (Mpa) | | |
|---|---|---|---|---|---|---|---|---|
| | | | | | | 1 day | 11 days | 28 days |
| Plain | — | — | 7.5 | 0.8 | 5:08 | 1360 | 4200 | 4980 |
| Calcium Lignosulfonate | 0.2 | 8 | 7.75 | 1.4 | 6:51 | 1770 | 5550 | 6420 |
| Gluconate/ XTJ-508 | 0.2 | 10.4 | 7.75 | 4.4 | 7:01 | 1770 | 4970 | 5880 |
| Gluconate/ XTJ-234 | 0.2 | 10 | 7.5 | 2.1 | 6:17 | 1930 | 5030 | 6300 |
| Glucoheptonate/ XTJ-234 | 0.2 | 15.1 | 8 | 1.5 | 6:17 | 2600 | 6510 | 7410 |
| Glucoheptonate/ XTJ-508 | 0.2 | 16.8 | 8.25 | 1.6 | 6:48 | 2490 | 6800 | 7750 |

Oligomeric dispersant produces greater water reduction than lignosulfonate dispersants at the same dosage. Better performing oligomeric dispersants were less retarding with greater water reduction and produced higher concrete compressive strength. Glucoheptonate anchor performs better than the gluconate anchor.

EXAMPLE 8

A concrete batch was prepared to compare dispersants of the composition of matter to BNS and polycarboxylate dispersants. The dispersant of the composition of matter used a glucoheptonate molecule as the A moiety and as the C moiety, a methoxy polyoxyalkylene amine, namely JEFFAMINE® M-2070 (XTJ-508) from Huntsman Corporation with a 2000 molecular weight (2K), or JEFFAMINE® XTJ-234 from Huntsman Corporation with a 3000 molecular weight (3K). The reference dispersant was a polymeric carboxylate backbone with polyether group side chains.

The mix consisted of 20.5 kg of Portland cement, 61 kg of crushed stone, 46 kg of sand, and 9.03 kg of water to provide a water to cement ratio of 0.46. The amount of dispersant is listed below in Table 8.

The concrete mixer was loaded with a portion of the mix water. The dispersant, stone, cement and sand were added to the mixer. The mixer was started and the remaining water was added. The mixture was mixed for 5 minutes at a drum rotation rate of about 19 rpm. The slump and air were measured initially. The mixer rate was reduced to about 4 rpm until one minute before each sample time. At one minute before taking the sample, the mixer rate was increased to about 19 rpm. Note, all mixes, except the BNS mix, contained a defoamer, which was a non-silicone proprietary mixture sold as SURFYNOL® DF-75 from Air Products, added at 0.75% by weight of the dispersant.

TABLE 8

| Sample | Dose % cement | % Air Initial | % Air 45 min | % Air 65 min | Slump (mm) Initial | Slump (mm) 45 min | Slump (mm) 65 min | Set Time (hours) |
|---|---|---|---|---|---|---|---|---|
| Gluco.3k | 0.2 | 1.4 | 1.9 | 2 | 230 | 170 | 115 | 6 |
| BNS | 0.4 | 2.2 | 1.7 | | 215 | 70 | | 5 |
| Polycarboxylate | 0.14 | 1.7 | 1.8 | 2.1 | 205 | 120 | 120 | 5 |
| Polycarboxylate | 0.16 | 1.1 | 2 | 2.1 | 230 | 180 | 165 | 5.75 |

The results in Table 8 show that the dispersant of the composition of matter has improved slump retention as compared to BNS, and performs comparably to the reference polycarboxylates to provide improved slump retention properties.

EXAMPLE 9

The alkoxysilane dispersant that was prepared as in Synthesis Example 4 was tested in combination with a polycarboxylate dispersant in a cementitious mixture. The polycarboxylate dispersant was a polymeric carboxylate backbone with polyether group side chains. The cementitious mixture was prepared as described in Example 8. Both samples contained a defoamer, which was a non-silicone proprietary mixture sold as SURFYNOL® DF-75 from Air Products, added at 0.75% by weight of the dispersant. The results are reported in Table 9.

The alkoxysilane dispersant improved concrete slump retention without increasing set time and decreasing early age concrete compressive strength.

EXAMPLE 10

The alkoxysilane dispersant that was prepared as in Synthesis Example 4 was tested in combination with another oligomeric dispersant in a cementitious paste. The cementitious paste was prepared as described in Example 1 with a water to cement ratio of 0.35. The other oligomeric dispersant had glucoheptonate as the A moiety and JEFFAMINE® M-2070 (XTJ-508) from Huntsman Corporation with a 2000 molecular weight as the C moiety (Other). The alkoxysilane "blocked" or latent dispersant was added at the dosages described below in Table 10.

TABLE 9

| Sample | Dose % cement | % Air Initial | % Air 65 min | % Air 125 min | Slump (mm) Initial | Slump (mm) 65 min | Slump (mm) 125 min | Set Time hours | Compressive Strength (psi) 1 day | Compressive Strength (psi) 7-day |
|---|---|---|---|---|---|---|---|---|---|---|
| Polycarboxylate | 0.16 | 2.4 | 3.4 | 2.5 | 230 | 205 | 110 | 6.1 | 2660 | 5400 |
| Polycarboxylate/Alkoxysilane | 0.12/0.10 | 1.9 | 2.4 | 2.7 | 230 | 220 | 175 | 6.4 | 2690 | 5830 |

TABLE 10

| Dispersant | Dose % cement | Paste Mass Flow Rate (g/sec) Initial | 60 min | 120 min | 180 min | Paste Spread Diameter (cm) Initial | 60 min | 120 min | 180 min |
|---|---|---|---|---|---|---|---|---|---|
| Other | 0.1 | 44 | 35 | 24 | 10 | 12.2 | 12.0 | 9.9 | 8.6 |
| Other/Alkoxysilane | 0.1 0.1 | 60 | 69 | 66 | 54 | 15.0 | 17.7 | 16.9 | 16.0 |
| Other/Alkoxysilane | 0.1 0.2 | 72 | 84 | 84 | 79 | 17.4 | 21.5 | 21.6 | 22.3 |

The results in Table 10 show that the alkoxysilane dispersant significantly increases the duration of the dispersed state when used in combination with another oligomeric dispersant. The effect of the alkoxysilane dispersant is related to dose, and performance increases with increasing dose.

EXAMPLE 11

The relationship of the A moiety functionality to fluidity of a cement paste was tested. Oligomeric dispersant performance was measured in cement paste with an oligomeric dispersant prepared with a single, 6-hydroxyl anchor molecule and an oligomeric dispersant prepared with two, 6-hydroxyl anchor molecules at the same end as shown in Synthesis Example 6. The C moiety was a methoxy polyoxyalkylene amine, JEFFAMINE® XTJ-234 from Huntsman Corporation with a 3,000 molecular weight. The test results are set forth in Table 11 below.

TABLE 11

| Sample | Starting A moiety | A Moiety Functionality after attachment to the C moiety | Number of A Moieties | C Moiety MW | Dose (% of cement) | Paste Mass Flow Rate (g/sec) | Paste Spread Diameter (cm) | % Change in Flow |
|---|---|---|---|---|---|---|---|---|
| 1 | α-D-glucoheptonic-γ-lactone | 6-OH | 1 | 3,000 | 0.1 | 50 | 13 | 2 |
| 2 | α-D-glucoheptonic-γ-lactone | 2(6-OH) | 2 | 3,000 | 0.1 | 57 | 12 | −29 |

The results demonstrate that the two oligomeric dispersants produced pastes of similar initial fluidity, but differed in their ability to maintain paste fluidity. As shown by the % change in flow the oligomeric dispersant with two anchor molecules (A Moieties) consistently had a higher rate of fluidity loss over time compared to the single anchor version (One A Moiety). Additionally, a slightly greater initial mass flow rate and slightly smaller spread diameter were consistently observed with the double anchor oligomeric dispersant compared to the single anchor molecule oligomeric dispersant. The total number of active functional groups on the A moiety(s) influences the performance of the dispersant. As the total number of active functional groups increases, the dispersing performance increases.

The composition of matter therefore is demonstrated to provide an oligomeric dispersant for dispersing cementitious particles, wherein the dispersant adsorbs onto the particle to be dispersed to provide a material that is several times more efficient than traditional dispersants, such as beta naphthalene sulfonates, sulfonated melamine formaldehyde condensates, or calcium lignosulfonates, and to provide a full range (Type A to Type F) water reducing capability.

The composition of matter also includes the novel compositions of matter, which include a reaction product of component A, optionally component B, and component C;
wherein each component A is independently a nonpolymeric, multi-functional moiety or combination of mono- or multifunctional moieties that adsorbs onto a cementitious particle, and contains at least one residue derived from a first component selected from the group consisting of sulfates, sulfonates, sulfinates, borates, boronates, boroxines, phosphoramides, alkyl trialkoxy silanes, alkyl triacyloxy silanes, alkyl triaryloxy silanes, non-sugar amines, amides, quaternary ammonium groups, non-sugar carboxylic acids, carboxylic acid esters, non-sugar alcohols, salts of any of the preceding moieties, and mixtures thereof;
wherein component B is an optional moiety, where if present, each component B is independently a nonpolymeric moiety that is disposed between the component A moiety and the component C moiety, and is derived from a second component selected from the group consisting of linear saturated hydrocarbons, linear unsaturated hydrocarbons, saturated branched hydrocarbons, unsaturated branched hydrocarbons, alicyclic hydrocarbons, heterocyclic hydrocarbons, aryl, phosphoester, nitrogen containing compounds, and mixtures thereof; and
wherein component C is at least one moiety that is a linear or branched water soluble, nonionic polymer substantially non-adsorbing to cement particles, and is selected from the group consisting of poly(oxyalkylene glycol), poly(oxyalkylene amine), poly(oxyalkylene diamine), monoalkoxy poly(oxyalkylene amine), monoaryloxy poly(oxyalkylene amine), monoalkoxy poly (oxyalkylene glycol), monoaryloxy poly(oxyalkylene glycol), poly(vinyl pyrrolidones), poly(methyl vinyl ethers), poly(ethylene imines), poly(acrylamides), polyoxazoles, and mixtures thereof.

In certain embodiments the composition of matter is represented by the following general structure (II):

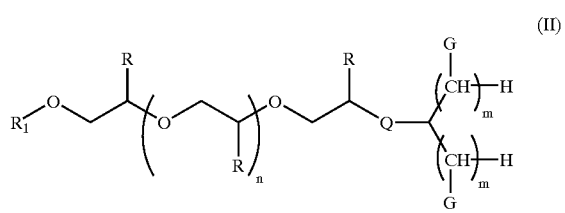

wherein
R$_1$ is at least on H, C$_1$–C$_{18}$ alkyl, phenyl, benzyl, or alkyl sulfonate;
each R is independently at least one of H, methyl, ethyl, propyl, butyl, or phenyl;
Q is at least one of carboxylic ester, thioester, amide, urethane, urea, ether, amine, a residue derived from isocyanate, hydroxy alkylidene amine, and hydroxy alkylidene ether;
G is at least one of —H, —OH, —COOH, a phosphate, a phosphonate, a phosphinate, a hypophosphite, sulfate, sulfonate, sulfinate, borate, blocked silane, and amine;
n=10–500;
m=2–10.

In other embodiments, the total number of functional (non-hydrogen) residues for G for the entire composition of matter is at least two. For example, each branch in the composition of matter could each have one functional residue for G.

In one embodiment the composition of matter according to general structure (II) is:

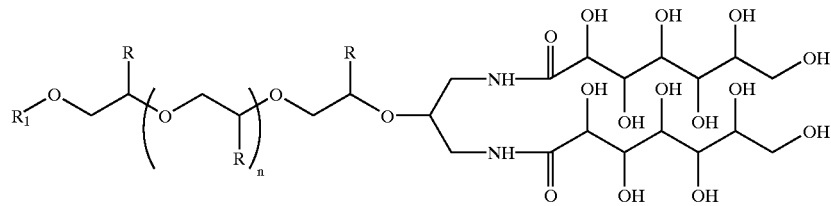

In other embodiments the composition of matter is represented by the following general structure (III):

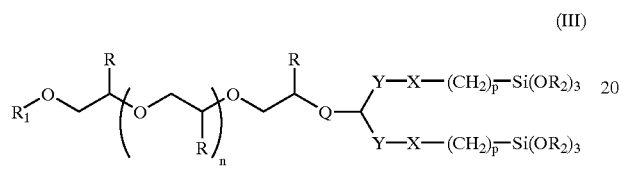

(III)

wherein
R$_1$ is at least one of H, C$_1$–C$_{18}$ alkyl, phenyl, benzyl, or alkyl sulfonate;
each R is independently at least one of H, methyl, ethyl, propyl, butyl, or phenyl;
Q is at least one of carboxylic ester, thioester, amide, urethane, urea, ether, amine, a residue derived from isocyanate, hydroxy alkylidene amine, and hydroxy alkylidene ether;
each Y is independently a C$_1$ to C$_5$ hydrocarbon that optionally contains at least one heteroatom;
each X is independently at least one of carboxylic ester, thioester, amide, urethane, urea, ether, amine, a residue derived from isocyanate, hydroxy alkylidene amine, and hydroxy alkylidene ether;
R$_2$ is C$_1$ to C$_6$ alkyl;
n=10–500;
p=2–5.

In one embodiment the composition of matter according to general structure (III) is the following:

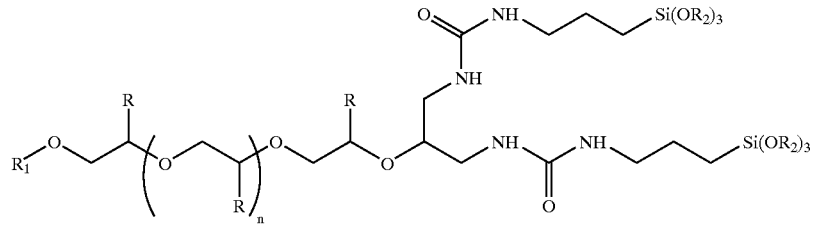

In certain other embodiments the composition of matter is represented by the following general structure (IV):

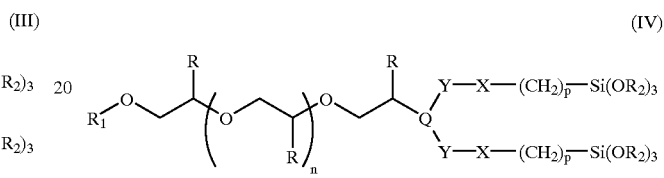

(IV)

wherein
R$_1$ is at least one of H, C$_1$–C$_{18}$ alkyl, phenyl, benzyl, or alkyl sulfonate;
each R is independently at least one of H, methyl, ethyl, propyl, butyl, or phenyl;
Q is at least one of urethane, urea, amide, amine;
each Y is independently a C$_1$ to C$_5$ hydrocarbon that optionally contains at least one heteroatom;
each X is independently at least one of carboxylic ester, thioester, amide, urethane, urea, ether, amine, a residue derived from isocyanate, hydroxy alkylidene amine, and hydroxy alkylidene ether;
R$_2$ is C$_1$ to C$_6$ alkyl;
n=10–500;
p=2–5.

In certain embodiments the compositions of matter according to general structure (IV) are the following:

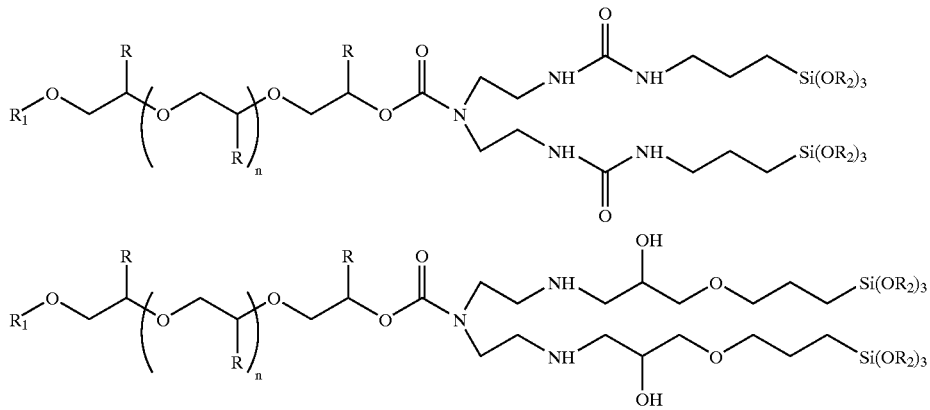

In certain embodiments the composition of matter is represented by the following general structure (V):

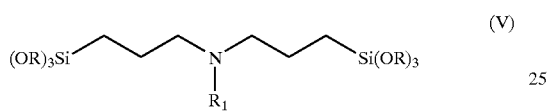

(V)

wherein
  each R is at least one of methyl, ethyl, n-propyl, i-propyl, or mixtures thereof;
  $R_1$ is -$(AO)_nR_2$
  $R_2$ is at least one of H, $CH_3$, $C_2$–$C_{18}$ alkyl, $C_2$–$C_{18}$ aryl alkyl, such as benzyl, or $C_2$–$C_{18}$ alkyl aryl, such as 4-methylphenyl;
  A is a residue derived from a $C_2$–$C_8$ alkyl,

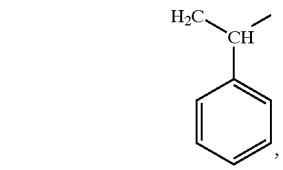

or mixtures thereof;
  n=5–300;
  EO/AO>40 mole %.

In other embodiments the composition of matter is represented by the following general structure (VI):

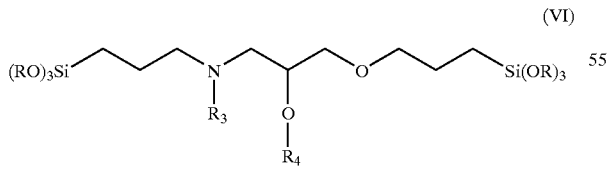

(VI)

wherein R is independently at least one of H or $C_1$–$C_{18}$ alkyl;
  $R_1$ is -$(AO)_nR_2$
    $R_2$ is at least one of H, $CH_3$, $C_2$–$C_{18}$ alkyl, $C_2$–$C_{18}$ aryl alkyl, such as benzyl, or $C_2$–$C_{18}$ alkyl aryl, such as 4-methylphenyl;
  A is a residue derived from a $C_2$–$C_8$ alkyl,

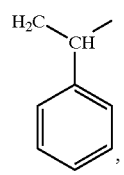

or mixtures thereof;
  n=5–300;
  EO/AO>40 mole %.
  $R_3$, $R_4$ is H, $CH_3$, or $R_1$, wherein at least one $R_3$ or $R_4$ is an $R_1$.

In other embodiments the composition of matter is represented by the following general structure (VII):

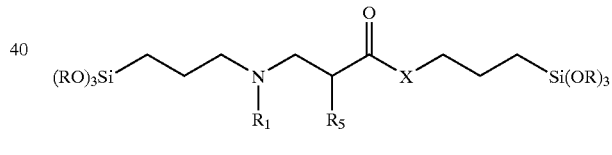

(VII)

wherein each R is methyl, ethyl, n-propyl, i-propyl, or mixtures thereof;
  $R_1$ is -$(AO)_nR_2$
    $R_2$ is H, $CH_3$, $C_2$–$C_{18}$ alkyl, $C_2$–$C_{18}$ aryl alkyl, such as benzyl, or $C_2$–$C_{18}$ alkyl aryl, such as 4-methylphenyl;
  A is a residue derived from a $C_2$–$C_8$ alkyl, or mixtures thereof;
  n=5–300;
  EO/AO>40 mole %;
  $R_5$ is H or $CH_3$;
  X is O or NH.

It should be appreciated that the composition of matter is not limited to the specific embodiments described above, but includes variations, modifications and equivalent embodiments defined by the following claims. The embodiments disclosed alone are not necessarily in the alternative, as various embodiments of the invention may be combined to provide desired characteristics or results.

What is claimed is:

1. A composition of matter comprising a reaction product of component A, component B, and component C;

wherein each component A is independently a nonpolymeric, multi-functional moiety or combination of mono or multifunctional moieties that adsorbs onto a cementitious particle, and contains more than one residue derived from a first component selected from the group consisting of alkyl trialkoxy silanes, alkyl triacyloxy silanes, alkyl triaryloxy silanes, salts of any of the preceding moieties, and mixtures thereof;

wherein, each component B is independently a nonpolymeric moiety that is disposed between the component A moiety and the component C moiety, and is derived from a second component selected from the group consisting of linear saturated hydrocarbons, linear unsaturated hydrocarbons, saturated branched hydrocarbons, unsaturated branched hydrocarbons, alicyclic hydrocarbons, heterocyclic hydrocarbons, aryl, phosphoester, nitrogen containing compounds, and mixtures thereof; and wherein component C is at least one moiety that is a linear or branched water soluble, nonionic polymer substantially non-adsorbing to cement particles, and is selected from the group consisting of poly(oxyalkylene glycol), poly(oxyalkylene amine), poly(oxyalkylene diamine), monoalkoxy poly(oxyalkylene amine), monoaryloxy poly(oxyalkylene amine), monoalkoxy poly(oxyalkylene glycol), monoaryloxy poly(oxyalkylene glycol), poly(vinyl pyrrolidones), poly(methyl vinyl ethers), poly(ethylene imines), poly(acrylamides), polyoxazoles, and mixtures thereof.

2. The composition of claim 1, wherein the composition has a structure selected from the group consisting of (i)$(A_x)_y$-B-$(C)_z$; (ii)$(C)_z$-B-$A_x$-B-$(C)_z$; (iii) $(A_x)_y$-B-C-B-$(A_x)_y$;

and mixtures thereof, wherein x is an integer from 1 to 3 and represents the number of independent A moieties, y is an integer from 2 to 3 and represents the number of independent A moieties, and z is an integer from 1 to 3 and represent the number of independent C moieties.

3. The composition of claim 1, wherein the A moiety is selected from the group consisting of amino propyl trimethoxysilane, bis(3-trimethoxysilylpropyl)amine, bis(3-triethoxysilylpropyl)amine, aminopropyltriethoxysilane, 3-glycidoxypropyltrimethoxy silane, 3-glycidoxypropyltriethoxysilane, 3-(triethoxysilyl)propyl isocyanate, 3-(trimethoxysilyl)propyl isocyanate, and mixtures thereof.

4. The composition of claim 1, wherein the B moiety is selected from the group consisting of $C_1$ to about $C_6$ linear saturated hydrocarbons, $C_2$ to about $C_6$ linear unsaturated hydrocarbons, $C_3$ to about $C_6$ branched saturated hydrocarbons, $C_3$ to about $C_6$ branched unsaturated hydrocarbons, about $C_5$ to about $C_{10}$ alicyclic hydrocarbons, about $C_4$ to about $C_{10}$ heterocyclic hydrocarbons, about $C_6$ to about $C_{10}$ arylenes, nitrogen containing compounds, and mixtures thereof.

5. The composition of claim 4, wherein the B moiety is selected from the group consisting of methylene, ethylene, n-propylene, n-butylene, n-pentylene, n-hexylene, isobutylene, neopentylene, propenylene, isobutenylene, diethylene triamine, triethylene tetramine, tetraethylene pentamine, pentaethylene hexamine, a residue derived from toluene diisocyanate, a residue derived from isophorone diisocyanate, a residue derived from a two nitrogen heteroatom heterocyclic hydrocarbon, a residue derived from a three nitrogen heteroatom heterocyclic hydrocarbon, phenylene, substituted arylenes, and mixtures thereof.

6. The composition of claim 4, wherein the B moiety is selected from the group consisting of

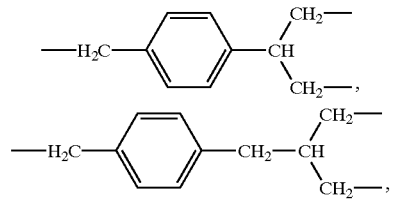

and mixture thereof.

7. The composition of claim 1, wherein the C moiety has a number average molecular weight from about 500 to about 100,000.

8. The composition of claim 7, wherein the C moiety has a number average molecular weight from about 1,000 to about 50,000.

9. The composition of claim 8, wherein the C moiety has a number average molecular weight from about 1,000 to about 30,000.

10. The composition of claim 1, wherein the composition has a number average molecular weight from about 650 to about 100,000.

11. The composition of claim 10, wherein the composition has a number average molecular weight from about 1,150 to about 50,000.

12. The composition of claim 11, wherein the composition has a number average molecular weight from about 1,150 to about 30,000.

13. The composition of claim 1, wherein the composition is represented by the following structure:

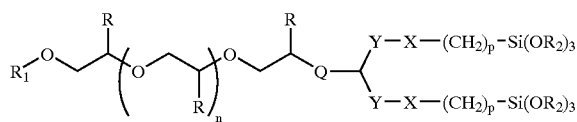

wherein $R_1$ is at least one of H, $C_1$–$C_{18}$ alkyl, phenyl, benzyl, or alkyl sulfonate;

each R is independently at least one of H, methyl, ethyl, propyl, butyl, or phenyl;

Q is at least one of carboxylic ester, thioester, amide, ethane, urea, ether, amine, a residue derived from isocyanate, hydroxy alkylidene amine, or hydroxy alkylidene ether;

each Y is independently a $C_1$ to $C_5$ hydrocarbon that optionally contains at least one heteroatom;

each X is independently at least one of carboxylic ester, thioester, amide, urethane, urea, ether, amine, hydroxy alkylidene amine, a residue derived from isocyanate, and hydroxy alkylidene ether;

$R_2$ is $C_1$ to $C_6$ alkyl;

n=10–500;

p=2–5.

14. The composition of claim 13, wherein the composition is represented by the following structure:

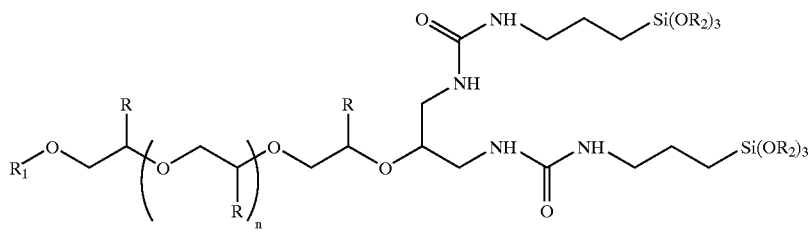

wherein $R_1$, is at least one of H, $C_1$–$C_{18}$ alkyl, phenyl, benzyl, or alkyl sulfonate;

each R is independently at least one of H, methyl, ethyl, propyl, butyl, or phenyl;

$R_2$ is $C_1$ to $C_6$ alkyl;

n=10–500.

15. The composition of claim 1, wherein the composition is represented by the following structure:

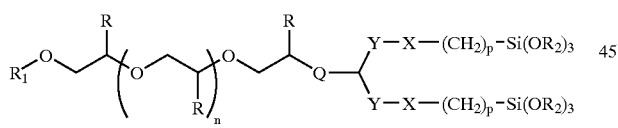

wherein $R_1$ is at least one of H, $C_1$–$C_{18}$ alkyl, phenyl, benzyl, or alkyl sulfonate;

each R is independently at least one of H, methyl, ethyl, propyl, butyl, or phenyl;

Q is at least one of urethane, urea, amide, amine;

each Y is independently a $C_1$ to $C_5$ hydrocarbon that optionally contains at least one heteroatom;

each X is independently at least one of carboxylic ester, thioester, amide, urethane, urea, ether, amine, a residue derived from isocyanate, hydroxy alkylidene amine, or hydroxy alkylidene ether;

$R_2$ is $C_1$ to $C_6$ alkyl;

n=10–500;

p=2–5.

16. The composition of claim 15, wherein the composition is represented by a structure selected from the group consisting of:

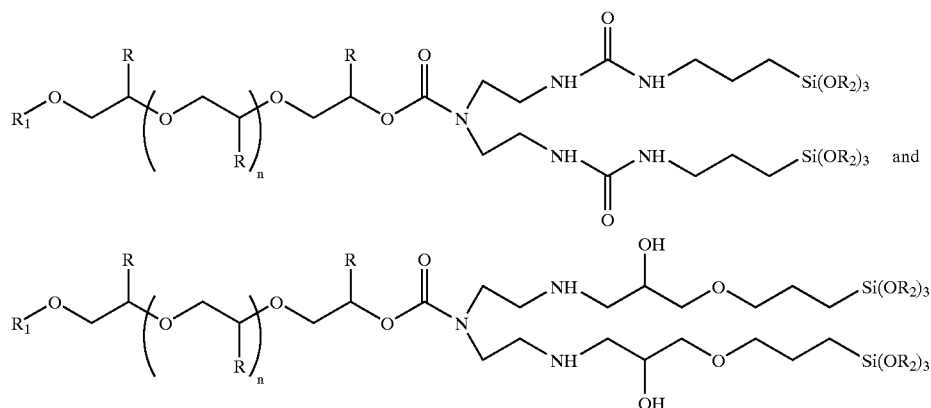

wherein $R_1$ is at least one of H, $C_1$–$C_{18}$ alkyl, phenyl, benzyl, or alkyl sulfonate;

each R is independently at least one of H, methyl, ethyl, propyl, butyl, or phenyl;

n=10–500.

17. The composition of claim 1, wherein the composition is represented by the following structure:

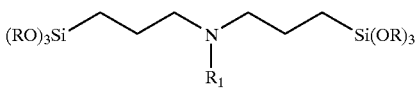

wherein

R is independently at least one of methyl, ethyl, n-propyl, i-propyl, or mixtures thereof;

$R_1$ is -$(AO)_n R_2$ $R_2$ is at least one of H, $CH_3$, $C_2$–$C_{18}$ alkyl, $C_2$–$C_{18}$ aryl alkyl, or $C_2$–$C_{18}$ alkyl aryl;

A is a residue derived from a $C_2$–$C_8$ alkyl,

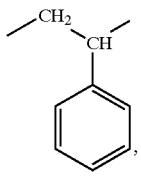

or mixtures thereof;
n=5–300;
EO/AO>40 mole %.

18. The composition of claim 1, wherein the composition is represented by the following structure:

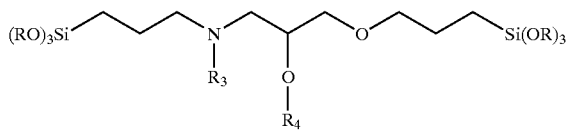

wherein

R is independently at least one of methyl, ethyl, n-propyl, i-propyl, or mixtures thereof;

$R_1$ is -(AO)$_n$$R_2$ $R_2$ is at least one of H, $CH_3$, $C_2$–$C_{18}$ alkyl, $C_2$–$C_{18}$ aryl alkyl, or $C_2$–$C_{18}$ alkyl aryl;

A is a residue derived from a $C_2$–$C_8$ alkyl,

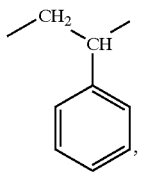

or mixtures thereof;
n=5–300;
EO/AO>40 mole %.

$R_3$, $R_4$ is H, $CH_3$, or $R_1$, wherein at least one $R_3$ or $R_4$ is $R_1$.

19. The composition of claim 1, wherein the composition is represented by the following structure:

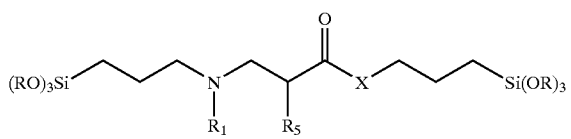

wherein

R is independently at least one of methyl, ethyl, n-propyl, i-propyl, or mixtures thereof;

$R_1$ is -(AO)$_n$$R_2$ $R_2$ is H, $CH_3$, $C_2$–$C_{18}$ alkyl, $C_2$–$C_{18}$ is aryl alkyl, or $C_2$–$C_{18}$ alkyl aryl A is a residue derived from a $C_2$–$C_8$ alkyl,

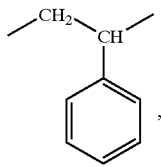

or mixtures thereof;
n=5–300;
EO/AO>40 mole %;
$R_5$ is H or $CH_3$;
X is O or NH.

20. A cementitious composition comprising a cementitious material and a dispersant comprising a reaction product of component A, component B, and component C;

wherein each component A is independently a nonpolymeric, multi-functional moiety or combination of mono- or multifunctional moieties that adsorbs onto a cementitious particle, and contains at least one residue derived from a first component selected from the group consisting of alkyl trialkoxy silanes, alkyl triacyloxy silanes, alkyl triaryloxy silanes, salts of any of the preceding moieties, and mixtures thereof;

wherein component B is an optional moiety, where if present, each component B is independently a nonpolymeric moiety that is disposed between the component A moiety and the component C moiety, and is derived from a second component selected from the group consisting of linear saturated hydrocarbons, linear unsaturated hydrocarbons, saturated branched hydrocarbons, unsaturated branched hydrocarbons, alicyclic hydrocarbons, heterocyclic hydrocarbons, aryl, phosphoester, nitrogen containing compounds, and mixtures thereof; and wherein component C is at least one moiety that is a linear or branched water soluble, nonionic polymer substantially non-adsorbing to cement particles, and is selected from the group consisting of poly(oxyalkylene glycol), poly(oxyalkylene amine), poly(oxyalkylene diamine), monoalkoxy poly(oxyalkylene amine), monoaryloxy poly(oxyalkylene amine), monoalkoxy poly(oxyalkylene glycol), monoaryloxy poly(oxyalkylene glycol), poly(vinyl pyrrolidones), poly(methyl vinyl ethers), poly(ethylene imines), poly(acrylamides), polyoxazoles, and mixtures thereof.

21. The cementitious composition of claim 20 further characterized by at least one of the following:

a. the cement is selected from the group consisting of portland cement, masonry cement, oil well cement, alumina cement, refractory cement, magnesia cement, calcium sulfoaluminate cement, and mixtures thereof;

b. the cement dispersant is present in an amount from about 0.005 to about 2% based on the dry weight of the cementitious material;

c. the B moiety is selected from the group consisting of about $C_5$ to about $C_{10}$ alicyclic hydrocarbons, about $C_4$ to about $C_{10}$ heterocyclic hydrocarbons, and mixtures thereof;

d. the C moiety has a number average molecular weight from about 500 to about 100,000; and e. the dispersant has a number average molecular weight from about 650 to about 100,000.

22. The cementitious composition of claim 20 further comprising at least one of:
   a. aggregate;
   b. a cement admixture selected from the group consisting of set accelerators, set retarders, air entraining agents, air detraining agents, foaming agents, defoaming agents, corrosion inhibitors, shrinkage reducing agents, pozzolans, cementitious dispersants, pigments, and mixtures thereof;
   c. water in an amount from about 20% to about 100% based on the dry weight of the cementitious material; or
   d. an additive selected from the group consisting of soil, calcined clay, silica fume, fly ash and blast furnace slag, and mixtures thereof.

23. The cementitious composition of claim 20, wherein the salt of moiety A is selected from the group consisting of lithium, sodium, potassium, calcium, magnesium, aluminum, iron, ammonia, amines and mixtures thereof.

24. The composition of claim 20, wherein the dispersant has a structure selected from the group consisting of (i) $A_x$—C;
(ii) $A_x$—C—$A_x$;
(iii) C—$A_x$—C;
(iv) $(A_x)_y$—B—$(C)_z$;
(v) $(C)_z$—B—$A_x$—B—$(C)_z$;
(vi) $(A_x)_y$—B—C—B—$(A_x)_y$;

and mixtures thereof, wherein x is an integer from 1 to 3 and represent the number of independent A moieties, y is an integer from 1 to 3 and represents the number of independent A moieties, and z is an integer from 1 to 3 and represent the number of independent C moieties.

25. The cementitious composition of claim 20, wherein the A moiety is selected from the group consisting of amino propyl trimethoxysilane, bis(3-trimethoxysilylpropyl) amine, bis(3-triethoxysilylpropyl)amine, aminopropyltriethoxysilane, 3-glycidoxypropyltrimethoxy silane, 3-glycidoxypropyltriethoxysilane, 3-(triethoxysilyl) propyl isocyanate, 3-(trimethoxysilyl)propyl isocyanate, and mixtures thereof.

26. The cementitious composition of claim 20, wherein the B moiety is present and is selected from the group consisting of $C_1$ to about $C_6$ linear saturated hydrocarbons, $C_2$ to about $C_6$ linear unsaturated hydrocarbons, to about $C_6$ branched saturated hydrocarbons, $C_3$ to about $C_6$ branched unsaturated hydrocarbons, about $C_5$ to about $C_{10}$ alicyclic hydrocarbons, about $C_4$ to about $C_{10}$ heterocyclic hydrocarbons, about $C_6$ to about $C_{10}$ arylenes, nitrogen containing compounds, and mixtures thereof.

27. The cementitious composition of claim 20, wherein the B moiety is present and is selected from the group consisting of methylene, ethylene, n-propylene, n-butylene, n-pentylene, n-hexylene, isobutylene, neopentylene, propenylene, isobutenylene, diethylene triamine, triethylene tetramine, tetraethylene pentamine, pentaethylene hexamine, a residue derived from toluene diisocyanate, a residue derived from isophorone diisocyanate, a residue derived from two nitrogen heteroatom heterocyclic hydrocarbon, a residue derived from a three nitrogen heteroatom heterocyclic hydrocarbon, phenylene, substituted arylenes and mixtures thereof.

28. The cementitious composition of claim 20, wherein the B moiety is present and is selected from the group consisting of

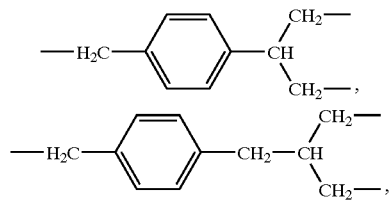

and mixtures thereof.

29. The cementitious composition of claim 20, wherein the C moiety has a number average molecular weight from about 500 to about 100,000.

30. The cementitious composition of claim 29, wherein the C moiety has a number average molecular weight from about 1,000 to about 50,000.

31. The cementitious composition of claim 30, wherein the C moiety has a number average molecular weight from about 1,000 to about 30,000.

32. The cementitious composition of claim 20, wherein the dispersant has a number average molecular weight from about 650 to about 100,000.

33. The cementitious composition of claim 32, wherein the dispersant has a number average molecular weight from about 1,150 to about 50,000.

34. The cementitious composition of claim 33, wherein the dispersant has a number average molecular weight from about 1,150 to about 30,000.

35. The cementitious composition of claim 20, wherein the dispersant is represented by the following structure:

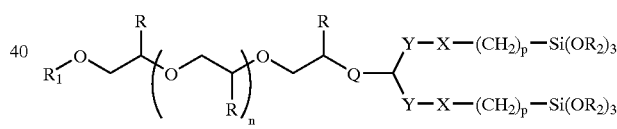

wherein
$R_1$ is at least one of H, $C_1$–$C_{18}$ alkyl, phenyl, benzyl, or alkyl sulfonate;
each R is independently at least one of H, methyl, ethyl, propyl, butyl, or phenyl;
Q is at least one of carboxylic ester, thioester, amide, urethane, urea, ether, amine, a residue derived from isocyanate, hydroxy alkylidene amine, or hydroxy alkylidene ether;
each Y is independently a $C_1$ to $C_5$ hydrocarbon at optionally contains at least one heteroatom;
each X is independently at least one of carboxylic ester, thioester, amide, urethane, urea, ether, amine, hydroxy alkylidene amine, a residue derived from isocyanate, or hydroxy alkylidene ether;
$R_2$ is $C_1$ to $C_6$ alkyl;
n=10–500;
p=2–5.

36. The cementitious composition of claim 35, wherein dispersant is represented by the following structure:

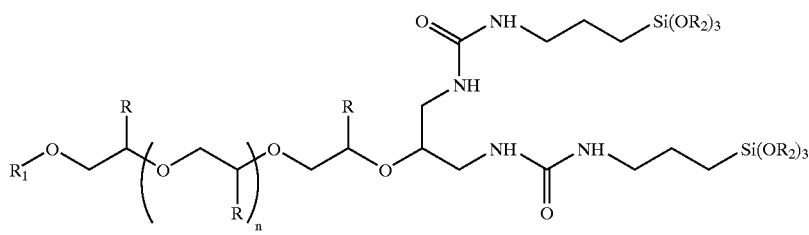

wherein $R_1$ is at least one of H, $C_1$–$C_{18}$ alkyl, phenyl, benzyl, or alkyl sulfonate;

each R is independently at least one of H, methyl, ethyl, propyl, butyl, or phenyl;

$R_2$ is $C_1$ to $C_6$ alkyl;

n=10–500.

37. The cementitious composition of claim 20, wherein the dispersant is represented by the following structure:

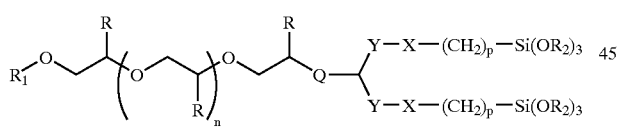

wherein $R_1$ is at least one of H, $C_1$–$C_{18}$ alkyl, phenyl, benzyl, or alkyl sulfonate;

each R is independently at least one of H, methyl, ethyl, propyl, butyl, or phenyl;

Q is at least one of urethane, urea, amide, amine;

each Y is independently a $C_1$ to $C_5$ hydrocarbon at optionally contains at least one heteroatom;

each X is independently at least one of carboxylic ester, thioester, amide, urethane, urea, ether, amine, a residue derived from isocyanate, hydroxy alkylidene amine, or hydroxy alkylidene ether;

$R_2$ is $C_1$ to $C_6$ alkyl;

n=10–500;

p=2–5.

38. The cementitious composition of claim 37, wherein the dispersant is represented by a structure selected from the group consisting of:

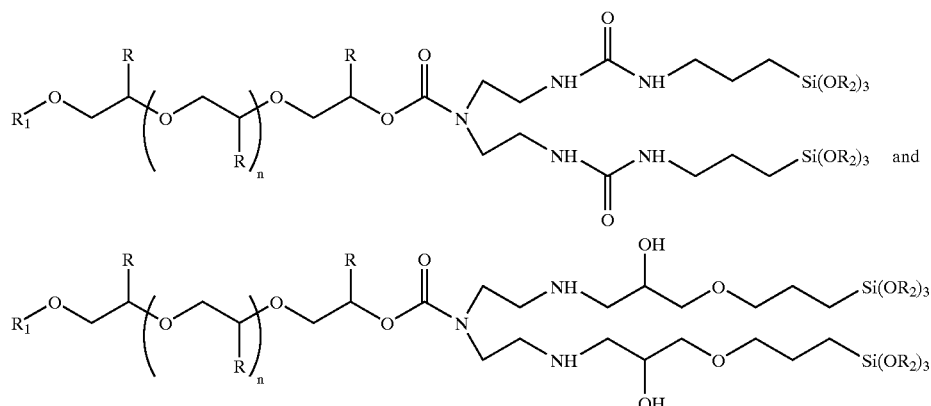

wherein $R_1$ is at least one of H, $C_1$–$C_{18}$ alkyl, phenyl, benzyl, or alkyl sulfonate;

each R is independently at least one of H, methyl, ethyl, propyl, butyl, or phenyl;

n=10–500.

39. The composition of claim 20, wherein the dispersant is represented by the following structure:

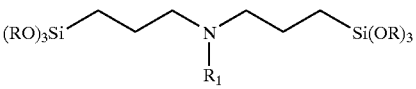

wherein

R is independently at least one of methyl, ethyl, n-propyl, i-propyl, or mixtures thereof;

$R_1$ is -$(AO)_nR_2$ $R_2$ is at least one of H, $CH_3$, $C_2$–$C_{18}$ alkyl, $C_2$–$C_{18}$ aryl alkyl, or $C_2$–$C_{18}$ alkyl aryl;

A is a residue derived from a $C_2$–$C_8$ alkyl,

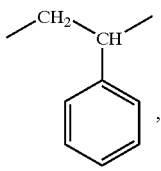

or mixtures thereof;
n=5–300;
EO/AO>40 mole %.

40. The cementitious composition of claim 20, wherein the dispersant is represented by the following structure:

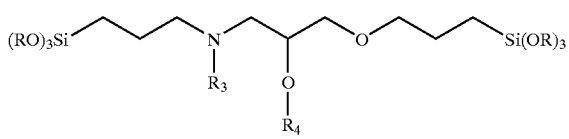

wherein

R is independently at least one of methyl, ethyl, n-propyl, i-propyl, or mixtures thereof;

$R_1$ is -(AO)$_n$R$_2$ $R_2$ is at least one of H, $CH_3$, $C_2$–$C_{18}$ alkyl, $C_2$–$C_{18}$ aryl alkyl, or $C_2$–$C_{18}$ alkyl aryl;

A is a residue derived from a $C_2$–$C_8$ alkyl,

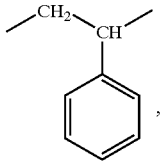

or mixtures thereof;
n=5–300;
EO/AO>40 mole %.

$R_3$, $R_4$ is H, $CH_3$, or $R_1$, wherein at least one $R_3$ or $R_4$ is $R_1$.

41. The cementitious composition of claim 20, wherein the dispersant is represented by the following structure:

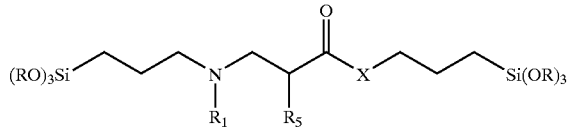

wherein

R is independently at least one of methyl, ethyl, n-propyl, i-propyl, or mixtures thereof;

$R_1$ is -(AO)$_n$R$_2$ $R_2$ is H, $CH_3$, $C_2$–$C_{18}$ alkyl, $C_2$–$C_{18}$ aryl alkyl, or $C_2$–$C_{18}$ alkyl aryl A is a residue derived from a $C_2$–$C_8$ alkyl,

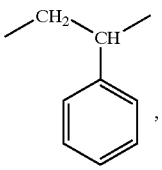

or mixtures thereof;
n=5–300;
EO/AO>40 mole %;
$R_5$ is H or $CH_3$;
X is O or NH.

* * * * *